Figure 1:
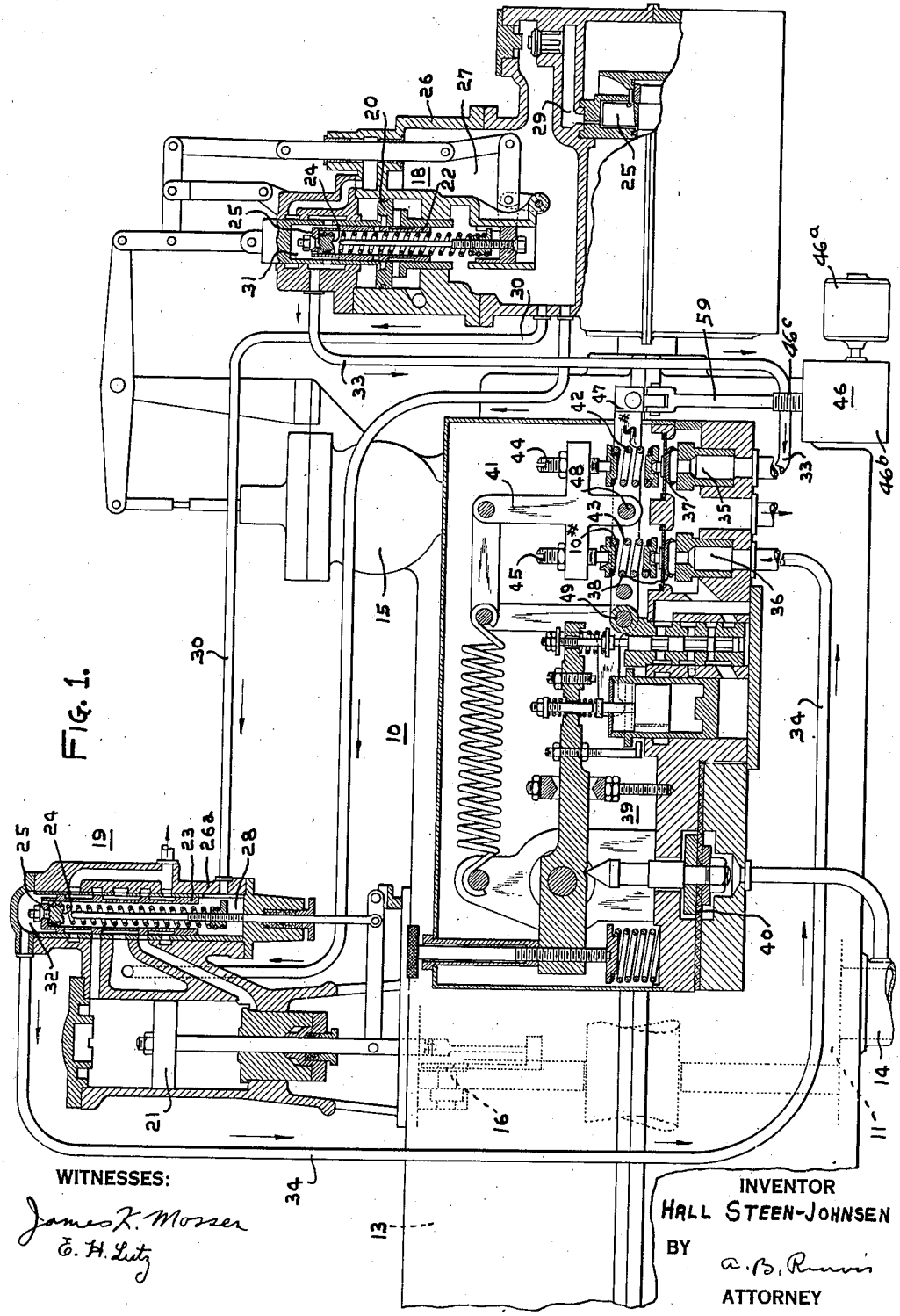

March 31, 1942.  H. STEEN-JOHNSEN  2,278,290
EXTRACTION PRESSURE REGULATING APPARATUS
Filed April 10, 1941  2 Sheets-Sheet 1

WITNESSES:
James K. Mosser
E. H. Lutz

INVENTOR
HALL STEEN-JOHNSEN
BY
A. B. Ruvis
ATTORNEY

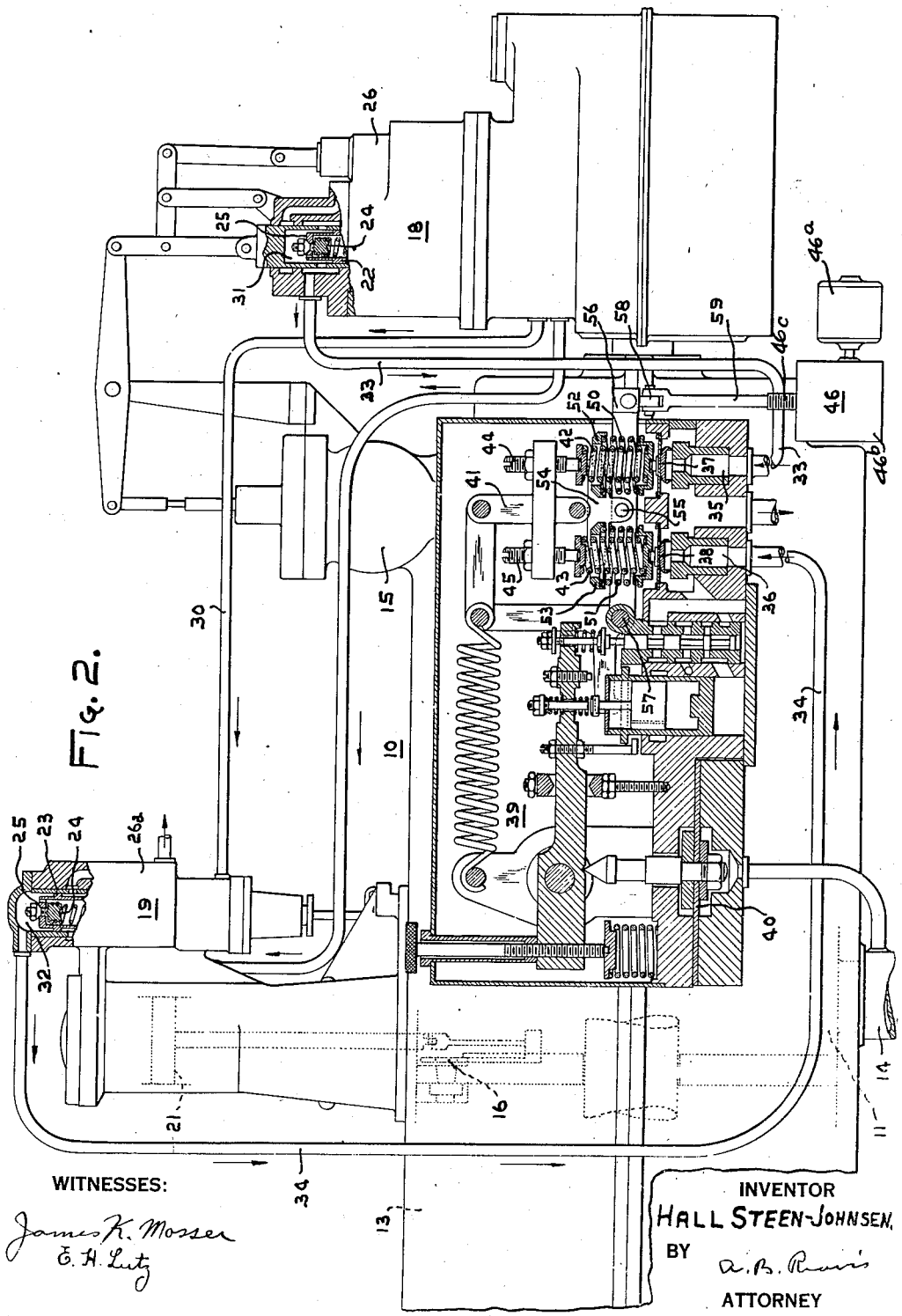

Patented Mar. 31, 1942

2,278,290

UNITED STATES PATENT OFFICE 2,278,290

EXTRACTION PRESSURE REGULATING APPARATUS

Hall Steen-Johnsen, Greensburgh, Pa., assignor to Westinghouse Electric & Manufacturing Company, East Pittsburgh, Pa., a corporation of Pennsylvania Application April 10, 1941, Serial No. 387,798

4 Claims. (Cl. 60—67)

This invention relates to bleeder or extraction turbines wherein changes in external load are effected by adjustment of a speed changer and the extraction or bleeder pressure is held approximately constant by means of a pressure regulator responsive to extraction pressure and it has for an object to provide apparatus of this character wherein the speed changer is so arranged that when it is operated there will be the same pressure change of the controlling pressures for the admission and extraction valve servo-motors and the same steam flow effected at the admission and extraction valves, thereby avoiding readjustment by the regulator and disturbance of the extraction pressure.

A further object of the invention is to provide an extraction regulator wherein the controlling pressures for the governor and extraction valve servo-motors are under control of extraction pressure, the controlling pressures being varied in a reciprocal manner by means of a pressure regulator including compression springs and wherein separate compression springs are operated by means of the speed changer to exert speed changing effects on the controlling pressures, the segregation of the effect of the speed changer from that of the pressure regulator making it possible to maintain the extraction pressure substantially constant without readjustment of the regulator and disturbance of such extraction pressure.

These and other objects are effected by the invention as will be apparent from the following description and claims taken in connection with the accompanying drawings, forming a part of this application, in which:

Fig. 1 is a side elevational view of an extraction turbine having an existing controlling system applied thereto; and Fig. 2 is a view similar to Fig. 1 but showing the extraction pressure regulator modified so that the pressure-regulating effects and operation of the speed changer may be segregated.

Referring now to the drawings more in detail, there is shown an extraction turbine, at 10, having the usual extraction chamber 11 arranged between the high-pressure and low-pressure turbine sections. An extraction line 14 communicates with the extraction chamber 11.

Steam is admitted to the turbine by means of the governor-controlled admission valve 15 and an extraction valve 16 controls the admission of steam from the extraction chamber 11 to the low-pressure turbine section 13.

The admission and extraction valves 15 and 16 are operated by means of servo-motors, at 18, and, at 19, respectively, the servo-motors embodying operating pistons 20 and 21 connected to the admission and extraction valves, respectively, and relays 22 and 23 control the application of motive fluid to the operating pistons for the respective servo-motors, at 18 and at 19.

As shown in Fig. 1, the turbine, at 10, has an impeller 25 for developing fluid under pressure varying substantially as the square of the speed. Each relay 22 and 23 has opposed piston or pressure areas 24 and 25 and the housings 26 and 26a provide impeller pressure chambers 27 and 28 for the areas 24. The impeller pressure is admitted by means of the passages 29 and 30, respectively, to the impeller pressure chambers 27 and 28 of the relays 22 and 23, respectively.

The housings 26 and 26a also provide for the piston areas 25 and back pressure chambers 31 and 32, respectively, these chambers being connected by means of the conduits 33 and 34, respectively, to the escape ports 35 and 36 having the cup valves 37 and 38 arranged in covering relation with respect thereto. Thus, by varying the downwardly-acting force exerted on the cup valves 37 and 38, the back pressures in the chambers 31 and 32 may be varied to secure suitable operation of the servo-motors, at 18, and, at 19, as will be immediately pointed out.

The extraction line 14 has associated therewith the pressure regulator, at 39, the regulator embodying an extraction pressure diaphragm or piston 40 which operates to move a rock lever 41 between the ends of which and the cup valves 37 and 38 are arranged first and second compression springs 42 and 43, respectively. Screws 44 and 45 provide for suitable relative adjustment of the compression of the springs 42 and 43.

In operation, if the bleeder or extraction pressure should increase in consequence of decreased bleeder or extraction demand, then the regulator operates to rock the lever 41 in a clockwise direction, thereby increasing the force of the spring 42 acting on the cup valve 37 to build up the back pressure in the chamber 31 and to decrease the force of the spring 43 to decrease the back pressure in the chamber 32, in consequence of which the servo-motor, at 18, is operated to restrict the admission of steam to the turbine and the servo-motor, at 19, is operated to increase the admission of steam from the extraction chamber 11 to the low-pressure section 13, as more fully disclosed in the patent to Bryant, 1,778,004, October 7, 1930. On the other hand, should the extraction pressure decline in consequence of increased extraction demand, the contrary operation takes place, the servo-motors operating to increase the admission of steam to the high-pressure section and to decrease the admission of steam to the low-pressure section.

Thus, the turbine should so operate that variations in extraction or bleeder demand are met with minimum changes in extraction pressure while at the same time disturbing to a minimum extent the external load-carrying capacity of the turbine sections. In general, the decrease in external load-carrying capacity of one section is compensated for by a corresponding increase in the external load-carrying capacity of the other section. Thus, if the external load capacity of the low-pressure section is decreased in consequence of moving of the extraction valve in a closing direction, that of the high-pressure section is increased by the increased admission of steam to the high-pressure section, these being operations in the proper directions to hold the extraction or bleeder pressure approximately constant or within a very narrow range of variation.

Assuming that the bleeder or extraction demand is held substantially constant and that the external load changes, then the speed changer, at 46, is operated to secure admission of steam to the turbine so as to meet the change in load. As shown, this effect is achieved by having the speed changer, at 46, connected to a lever 47 which is pivotally connected at 48 to the lever 41, the other end of the lever 47 being fulcrumed, at 49. The speed changer includes the usual reversible motor 46a for operating mechanism within the casing 46b and cooperating with the threaded portion 46c of the link 59 for raising and lowering the latter, for the purpose more fully hereinafter set forth. Thus, as the lever 47 is moved up and down by means of the speed changer, the lever 41 acts as an equalizer to change the forces exerted by the springs 42 and 43 on the cup valves 37 and 38.

If the speed changer is operated to increase the spring forces and to increase the back pressures in the chambers 31 and 32 in consequence of a decrease in external load, then the relays 22 and 23 will, in consequence, be operated to control the servo-motors, at 18, and, at 19, so as to move both the admission and extraction valves in closing directions. The contrary operation takes place in case there is an increase in external load demand. Irrespective of changes in load, however, the extraction pressure should be held approximately constant or within a very narrow range of variation.

A very serious difficulty with the system illustrated in Fig. 1 is that changes in external load necessarily mean changes in impeller pressure with the result that it is difficult to keep the servo-motors, at 18, and, at 19, operating in response to the pressure regulator, at 39, while at the same time holding the extraction pressure within a narrow range of variation. The main reason for this is not only this variation in impeller pressure but also the inability of the pressure regulator to secure such adjustments of the springs 42 and 43 as will hold the control pressures in correct relation to the impeller pressure so that the extraction pressure is maintained within a narrow range of variation.

On the other hand, with the transformer type of extraction regulator, the aforementioned difficulties are not encountered. A typical installation of the transformer type is illustrated and described in the application of Schwendner, Serial No. 361,849, filed October 19, 1940, and assigned to the Westinghouse Electric & Manufacturing Company. In this arrangement, the impeller pressure is not utilized directly by the admission valve and extraction valve servo-motors, but such impeller pressure is transformed into a regulating pressure, this regulating pressure being supplied to suitable spaces of the relays of both servo-motors and subjected to additional controlling or modifying effects by means of pressure regulator-controlled cup valves, as shown in Fig 1. With this arrangement, the bleeder or extraction turbine operates isochronously or at the same speed at different loads. Of course, if the turbine is connected in a synchronous electrical system, then the isochronous arrangement is discontinued, the amount of load then being determined by a load-control device. With the governor operating isochronously, the speed changer operates only to change the force of the spring associated with the transformer relay primary piston member, the operation being such that the primary piston member or relay always comes back to the same position when the prior speed is attained with a change in load. Thus, with the isochronous arrangement, the regulating pressure no longer bears a definite relation to the speed but only to that of load, the regulating pressure being changed in a sufficient amount to restore the speed with changes in load. The regulating pressure so provided is utilized to secure operation of the servo-motors in the manner described, cup valves similar to the cup valves 37 and 38 being associated with control pressure lines similar to the lines 33 and 34 to secure operation of the servo-motors to maintain the extraction pressure approximately constant, irrespective of variations in external load.

As shown in Fig. 1, the first and second springs 42 and 43 for the cup relief valves 37 and 38 are of different scale to give correct compensation for changes in extract steam.

When the speed changer of Fig. 1 is operated, because of the equalizing effect of the lever 41, the two springs are given the same compression, but, with different scale, the pressure change under the two springs will be different and the governor-controlled admission valve 15 and the extraction valve 16 will open or close different amounts, and the steam flow change through the two valves will be different with the result that the extraction pressure will change. To correct the extraction pressure, the regulator has to move to make up for the unequal effect of the speed changer.

It has been recognized for some time that an equal effect of the speed changer is important to get the superior operation so far as extraction pressure is concerned, such as is obtained when the transformer system is used. In Fig. 2, there is shown an improvement to the old arrangement shown in Fig. 1 wherein this effect is obtained. By means of the improvement illustrated in Fig. 2, the improved operation follows because of segregation of the operation of the regulator on the one hand from the speed changer on the other. To this end, in Fig. 2, in addition to first and second springs 42 and 43 arranged between the lever 41 and the cup valves 37 and 38, outer third and fourth springs 50 and 51 are nested about the first and second springs 42 and 43, the upper ends of the springs 50 and 51 being engaged by followers 52 and 53 connected to the equalizer lever 54 pivotally connected, at 55, to the lever 56 fulcrumed at one terminus 57 and having its other terminus pivotally connected, at 58, to a speed changer link 59. With this arrangement, the outer third and fourth springs 50 and 51 have the same scale and the linkage is such that the springs are compressed only by the speed changer, while the compression on the inside first and second springs 42 and 43 responds to the extraction regulator proper.

In this manner, when the speed changer is operated there will be the same pressure change of the controlling pressures in the lines 33 and 34 and the same steam flow effect at the admission valves 15 and at the extraction valves 16 thereby doing away with readjustment by the regulator and the disturbance of the extraction pressure.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In an extraction turbine, a high-pressure section, a low-pressure section separated from the high-pressure section by an extraction chamber, an extraction line, an admission valve for controlling the admission of steam to the high-pressure section, an extraction valve for controlling the admission of steam from the extraction chamber to the low-pressure section, servo-motors for controlling the admission and extraction valves, an impeller for developing fluid under pressure varying substantially as the square of the speed of the turbine, relays for controlling the application of motive fluid to the servo-motors, each relay having opposed first and second piston areas, means providing impeller pressure chambers for the first piston areas of the relays, means providing a back pressure chamber for the second piston area of each relay and into which fluid escaping from the impeller pressure chamber of the first piston area accumulates to develop back pressure, conduits connected to the back pressure chambers and having escape openings, cup valves in covering relation with respect to the openings, a pressure regulator including an abutment subject to extraction pressure, a first lever movable angularly about a pivot and having oppositely-extending arms, first and second springs between the arms and the respective cup valves, the arrangement being such that, with an increase in extraction pressure, the back pressure on the admission valve servo-motor relay is increased and that on the extraction valve servo-motor relay is decreased and vice versa, a speed changer, a second lever movable angularly about a pivot by adjustment of the speed changer, a third and equalizing lever pivoted at an intermediate point to the second lever, and third and fourth compression springs between opposite ends of the third lever and the cup valves.

2. The combination as claimed in claim 1 with means providing for adjustment of the compression of the first and second springs between the oppositely-extending arms of the first lever and the cup valves.

3. In a pressure regulator, a first lever having opposed arms, means responsive to pressure to tilt the first lever, means providing spaces for first and second controlling pressures and each space having an escape opening, first and second cup valves for the escape openings, first and second compression springs between the arms and the cup valves, a second lever, means for moving the second lever angularly, a third or equalizing lever pivotally connected at an intermediate point to the second lever, and third and fourth compression springs arranged between the other end of the third lever and the first and second cup valves.

4. The combination as claimed in claim 3 with means providing for relative variation of the compression of the first and second springs.

HALL STEEN-JOHNSEN.